(12) United States Patent
Clemen, Jr. et al.

(10) Patent No.: US 9,725,159 B2
(45) Date of Patent: Aug. 8, 2017

(54) MITIGATING SHOCK USING PLASMA

(71) Applicant: The Boeing Company, Chicago, IL (US)

(72) Inventors: Mark Joseph Clemen, Jr., Port Orchard, WA (US); Donald V. Drouin, Jr., O'Fallon, IL (US); Alan F. Stewart, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/936,953

(22) Filed: Nov. 10, 2015

(65) Prior Publication Data
US 2017/0129592 A1    May 11, 2017

(51) Int. Cl.
*B64C 23/00*    (2006.01)
*B64C 21/00*    (2006.01)

(52) U.S. Cl.
CPC ............ *B64C 21/00* (2013.01); *B64C 23/005* (2013.01); *B64C 2230/12* (2013.01)

(58) Field of Classification Search
CPC .... B64C 23/00; B64C 23/005; B64C 2230/12
See application file for complete search history.

(56) References Cited

U.S. PATENT DOCUMENTS

| | | | |
|---|---|---|---|
| 6,441,552 B1 * | 8/2002 | Brandenburg | H05H 1/24 315/111.21 |
| 7,121,511 B2 * | 10/2006 | Kremeyer | B64C 23/005 239/8 |
| 7,988,101 B2 | 8/2011 | Osborne et al. | |
| 8,016,246 B2 | 9/2011 | Schwimley et al. | |
| 8,016,247 B2 | 9/2011 | Schwimley et al. | |
| 8,220,753 B2 * | 7/2012 | Silkey | B64C 23/005 244/204.1 |
| 8,251,318 B2 | 8/2012 | Khozikov et al. | |
| 2007/0040726 A1 | 2/2007 | Kremeyer | |
| 2010/0004799 A1 | 1/2010 | Drouin, Jr. et al. | |

FOREIGN PATENT DOCUMENTS

| | | |
|---|---|---|
| EP | 2532586 A2 | 12/2012 |
| EP | 2801829 A1 | 11/2014 |

OTHER PUBLICATIONS

"Hypersonic Flow," Aerospaceweb.org, copyright 1997-2012, 7 pages, accessed Oct. 23, 2015. http://www.aerospaceweb.org/design/waverider/flow.shtml.

(Continued)

*Primary Examiner* — Brian M O'Hara
(74) *Attorney, Agent, or Firm* — Yee & Associates, P.C.

(57) ABSTRACT

A method, apparatus, and system for mitigating undesired effects of a vehicle traveling at a speed greater than a critical Mach number for the vehicle. Ultraviolet energy is generated using a plurality of ultraviolet energy sources associated with an interior structure of the vehicle that travels at the speed greater than the critical Mach number for the vehicle. The ultraviolet energy is transported from the plurality of ultraviolet energy sources past an exterior of the vehicle around a selected location of the vehicle. A plasma is created around the selected location to mitigate the undesired effects of the vehicle traveling at the speed greater than the critical Mach number for the vehicle.

22 Claims, 5 Drawing Sheets

(56) References Cited

OTHER PUBLICATIONS

Kuo, "Plasma Mitigation of Shock Waves—Experiments and Theory," Shock Waves, vol. 17, Issue 4, Dec. 2007, pp. 225-239.
Futrzynski, "Drag reduction using plasma actuators," Licentiate Thesis, Royal Institute of Technology, Mar. 2015, 64 pages.
Extended European Search Report, dated Apr. 24, 2017, regarding Application No. 16187241.1, 7 pages.

* cited by examiner

MITIGATING SHOCK USING PLASMA

BACKGROUND INFORMATION

1. Field

The present disclosure relates generally to supersonic vehicles and, in particular, to mitigating the undesired effects of traveling at supersonic speeds. Still, more particularly, the present disclosure relates to a method and apparatus for using plasma to mitigate the undesired effects of a vehicle traveling at a speed that is greater than a critical Mach number for the vehicle.

2. Background

A supersonic vehicle is a vehicle that can travel at supersonic speeds, which are speeds that exceed the speed of sound. When a supersonic vehicle approaches and crosses the speed of sound, the effects of the finite viscosity of the air may cause various undesired effects. These undesired effects may include, but are not limited to, undesired shock effects, drag, and undesired heating of the supersonic vehicle. The undesired shock effects may include, for example, bow shock, shear shock, some other type of shock, or some combination thereof, that increases the draft force acting on the supersonic vehicle.

Air plasma is one means of mitigating the undesired effects of traveling at supersonic speeds. Current systems for generating air plasma include using systems that generate, for example, without limitation, electrical corona and discharge and microwave radio frequency (RF) discharge. However, these currently available systems may create air plasma that is heated more than desired. Heated air plasma may cause undesired heating of the supersonic vehicle and may affect the aerodynamic performance of the supersonic vehicle.

Further, these systems may create an undesired signature, such as a radio frequency signature, that may be detectable. Still further, controlling the air plasma that is created downstream may be more difficult than desired using these currently available systems. For example, the air plasma may interfere with the operation of an antenna device or antenna aperture on the supersonic vehicle. Therefore, it would be desirable to have a method and apparatus that take into account at least some of the issues discussed above, as well as other possible issues.

SUMMARY

In one illustrative embodiment, an apparatus comprises a plurality of ultraviolet energy sources and a plurality of light pipes. The plurality of ultraviolet energy sources are associated with an interior structure of a vehicle that can travel at a speed greater than a critical Mach number for the vehicle. The plurality of light pipes are coupled to the plurality of ultraviolet energy sources and transport ultraviolet energy from the plurality of ultraviolet energy sources past an exterior of the vehicle around a selected location of the vehicle to create a plasma around the selected location.

In another illustrative embodiment, a plasma generation system comprises a plurality of ultraviolet energy sources and a plurality of light pipes. The plurality of ultraviolet energy sources are associated with an interior structure of a supersonic vehicle. The plurality of light pipes are coupled to the plurality of ultraviolet energy sources and an exterior of the supersonic vehicle. The plurality of light pipes transport ultraviolet energy from the plurality of ultraviolet energy sources past the exterior of the supersonic vehicle around a selected location of the supersonic vehicle to create a plasma around the selected location.

In yet another illustrative embodiment, a method is provided for mitigating undesired effects of a vehicle traveling at a speed greater than a critical Mach number for the vehicle. Ultraviolet energy is generated using a plurality of ultraviolet energy sources associated with an interior structure of the vehicle that travels at the supersonic speed. The ultraviolet energy is transported from the plurality of ultraviolet energy sources past an exterior of the vehicle around a selected location of the vehicle. A plasma is created around the selected location that mitigates the undesired effects of the vehicle traveling at the speed greater than the critical Mach number for the vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for generating plasma around a vehicle to mitigate the undesired effects created when the vehicle is transonic, supersonic, or hypersonic. As one illustrative example, it may be desirable to have a method and apparatus for generating plasma around a supersonic aircraft to mitigate the undesired effects created when the supersonic aircraft is transonic, supersonic, or hypersonic.

In particular, the illustrative embodiments recognize and take into account that ultraviolet energy may be used to generate plasma around a vehicle. In particular, an ultraviolet energy source, such as, but not limited to, a light emitting semiconductor, may be used to generate plasma ions in air without requiring heating of the air. For example, a single photon having an ultraviolet wavelength may be used to create plasma ions in air without requiring the assistance of heating the air.

Further, ultraviolet energy sources may be used to create plasma in air around selected locations around a supersonic vehicle without the risk of the plasma flowing downstream and interfering with the performance of a sensor device or aperture on the supersonic vehicle. Ultraviolet energy sources may also be a simple and cost-effective solution for the generation of plasma in air around a supersonic vehicle.

Thus, the illustrative embodiments provide a method and apparatus for generating plasma around a vehicle to mitigate undesired effects that occur when the vehicle is transonic, supersonic, or hypersonic. In one illustrative example, ultraviolet energy is generated using a plurality of ultraviolet energy sources associated with an interior structure of the vehicle that travels at a speed greater than a critical Mach number for the vehicle. The ultraviolet energy is transported from the plurality of ultraviolet energy sources past an exterior of the vehicle around a selected location of the vehicle. A plasma is created around the selected location that mitigates the undesired effects of the vehicle traveling at the speed greater than the critical Mach number for the vehicle.

Figure 1:
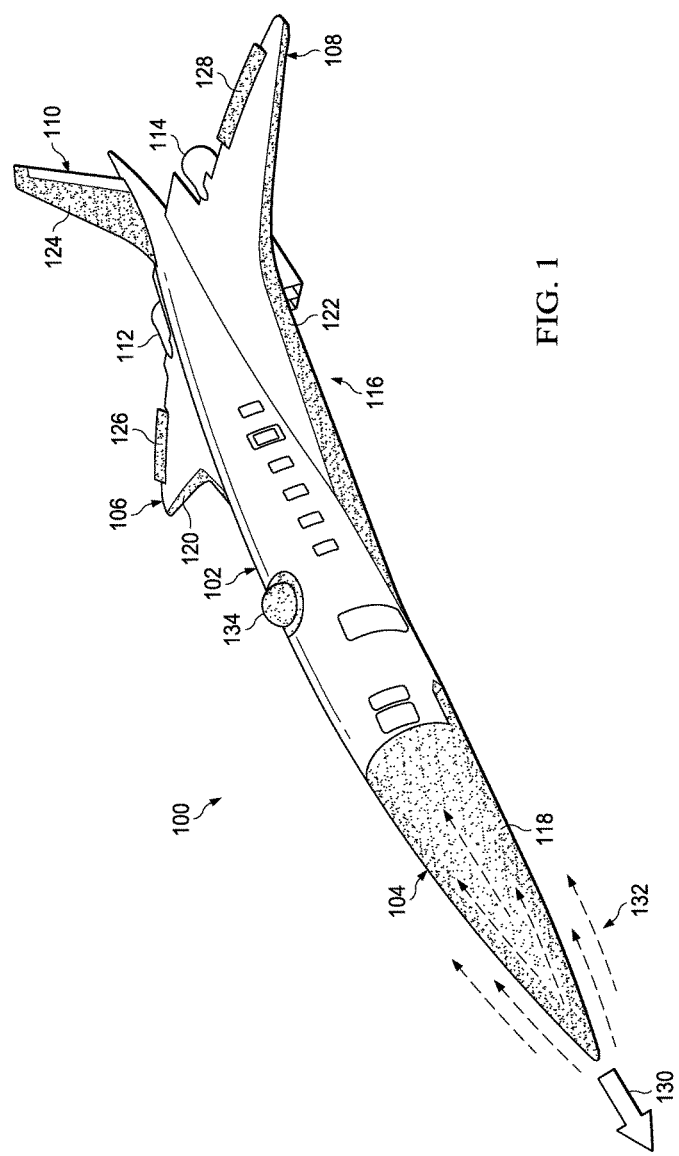
FIG. 1 is an illustration of an isometric view of a supersonic vehicle in accordance with an illustrative embodiment.

Referring now to the figures and, in particular, with reference to FIG. 1, an illustration of an isometric view of a supersonic vehicle is depicted in accordance with an illustrative embodiment. In this illustrative example, supersonic vehicle 100 includes body 102, nose section 104, wing 106, wing 108, tail section 110, engine 112, and engine 114.

In FIG. 1, plurality of regions 116 of supersonic vehicle 100 are distinguished. Plurality of regions 116 may include, for example, without limitation, at least one of region 118, region 120, region 122, region 124, region 126, region 128, region 134, or some other region of supersonic vehicle 100.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Depending on the implementation of supersonic vehicle 100, each region of plurality of regions 116 may be comprised of various types of structures. In one illustrative example, region 118 may include at least one of a forward section, a nose cone section, a fore body, or some other forward portion of supersonic vehicle 100.

Region 120 and region 122 may be located along the leading edge of wing 106 and wing 108, respectively. Region 120 may include one or more structures that form a leading edge of wing 106. Region 122 may include one or more structures that form a leading edge of wing 108. Depending on the implementation, region 120 and region 122 may each include at least a portion of at least one of a strake, a canard, a slat, or some other type of control surface.

Region 124 may be located proximate to the empennage and along the leading edge or across the entire surface area of tail section 110 of supersonic vehicle 100. In one illustrative example, region 124 may include at least one of a vertical or horizontal stabilizer, a rudder, a ruddervator, a horizontal elevator (not shown but known to those skilled in the art), or some other type of control surface. Region 126 and region 128 may each include at least one of an aileron, a spoiler, a flap, a flaperon, or some other type of wing control surface or trailing edge control surface.

In this illustrative example, region 134 includes a turret that is associated with supersonic vehicle 100. As used herein, when one component, such as a turret, is "associated" with another component, such as supersonic vehicle 100, the association is a physical association in the depicted examples. For example, a first component, such as turret, may be considered to be associated with a second component, such as supersonic vehicle 100, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both.

When region 134 includes a turret, this turret may be used to house one or more components of a radar system, a directed energy weapon, or some other type of system. In some cases, the turret may be used for housing sensors related to components and systems used for at least one of navigation, communications, or intelligence, surveillance, and reconnaissance (ISR). In some cases, the turret may be used for components related to electronic countermeasures, infrared countermeasures, or both.

Supersonic vehicle 100 is capable of traveling at a speed that is above Mach 1. A Mach number, such as Mach 1, Mach 2, Mach 4, or Mach 7, may be a ratio of airspeed to the speed of sound. In some illustrative examples, supersonic vehicle 100 takes the form of a hypersonic vehicle capable of traveling at speeds that exceed supersonic speeds. For example, supersonic vehicle 100 may be capable of traveling at speeds that are above about Mach 5.

As supersonic vehicle 100 approaches the speed of sound, supersonic vehicle 100 may become transonic. When supersonic vehicle 100 is transonic, a range of velocities of airflow 132 may exist surrounding and flowing past supersonic vehicle 100. This range of velocities may include velocities that are concurrently below, at, and above the speed of sound. For example, without limitation, this range of velocities may be between about Mach 0.8 and about Mach 1.2.

In these illustrative examples, supersonic vehicle 100 may be considered transonic when supersonic vehicle 100 travels at a speed that is between a critical Mach number for supersonic vehicle 100 and a higher speed that is greater than the speed of sound. The critical Mach number for supersonic vehicle 100 is the lowest Mach number at which at which airflow 132 over some portion of supersonic vehicle 100 reaches the speed of sound, but does not exceed the speed of sound.

When supersonic vehicle 100 travels at a speed greater than the critical Mach number, localized regions of transonic airflow, sonic airflow, and supersonic airflow may be created surrounding and flowing past supersonic vehicle 100. These localized regions of airflow may create shock waves that may, in turn, create undesired aerodynamic drag and, in some cases, other types undesired aerodynamic effects.

In one illustrative example, supersonic vehicle 100 may be considered transonic when traveling at a transonic speed that is between about Mach 0.8 and about Mach 1.2. In this illustrative example, supersonic vehicle 100 may be considered supersonic when traveling at a supersonic speed that is above about Mach 1.2. Further, in this illustrative example, supersonic vehicle 100 may be considered hypersonic when traveling at a hypersonic speed that is above a selected threshold speed. This selected threshold speed may be, for example, without limitation, about Mach 5.

When supersonic vehicle 100 travels at transonic speeds, supersonic speeds, or hypersonic speeds, a plasma generation system (not shown in this view) may be used to mitigate the undesired effects produced by traveling at transonic speeds, supersonic speeds, or hypersonic speeds. These undesired effects may include, for example, without limitation, undesired shock effects, drag, undesired heating of supersonic vehicle 100, some other type of undesired effect, or some combination thereof.

The plasma generation system (not shown) may include ultraviolet energy sources that are coupled to plurality of regions 116 of supersonic vehicle 100. The ultraviolet energy sources may generate ultraviolet energy that is used to create plasma ions in the air around plurality of regions 116. This ultraviolet energy may take the form of, for example, without limitation, far ultraviolet energy, middle ultraviolet energy, or some other type of ionizing ultraviolet energy.

In one illustrative example, the ultraviolet energy emitted from plurality of regions 116 may be ionizing ultraviolet radiation. This ionizing ultraviolet radiation may take the form of ultraviolet radiation having a wavelength less than about 300 nanometers. In one illustrative example, the ionizing ultraviolet radiation may have a wavelength less than about 280 nanometers. In yet another illustrative example, the ionizing ultraviolet radiation may have a wavelength less than about 180 nanometers.

When the ionizing ultraviolet radiation comes into contact with air molecules, at least a portion of the air molecules are ionized, thereby creating plasma ions. The plasma ions in the air may be referred to as plasma or air plasma.

Creating plasma in the air around plurality of regions 116 just before supersonic vehicle 100 becomes transonic or when supersonic vehicle 100 is transonic or supersonic may change a viscosity of the air around plurality of regions 116, which thereby mitigates the undesired effects of supersonic vehicle 100 being transonic or supersonic. For example, without limitation, changing the viscosity of the air around plurality of regions 116 mitigates shock effects that are undesired by reducing the formation of the shock waves created by the air flowing against supersonic vehicle 100. In one illustrative example, decreasing the viscosity of the air around plurality of regions 116 may decrease the formation of shock waves.

In particular, the plasma may affect the air within and outside of the boundary layer. The boundary layer is formed by the layer of air in the immediate vicinity of the exterior surface of supersonic vehicle 100. In some cases, multiple types of boundary layers may be present along this surface simultaneously.

The plasma ions in the air carry an electrical charge that reduces the viscosity of the air. In particular, the electrically charged ions may help cause the air to be repulsed from the surface of supersonic vehicle 100. This repulsion also changes the density and thickness of the boundary layer. Increasing the thickness of the boundary layer helps reduce drag. By reducing the viscosity of the air, prevents the air from being slowed down or stopped at the surface of supersonic vehicle 100.

Further, the air within the boundary layer has low energy. Plasma ions may add energy to this air. Re-energizing the air inside the boundary layer using the plasma allows the air in the boundary layer to travel much further against the adverse pressure gradients created during flight. When the boundary layer separates further off of supersonic vehicle 100, drag is reduced. Thus, the plasma helps maintain attachment of the boundary layer to the supersonic vehicle 100.

During transonic and supersonic flight, shock waves may be formed by the coherent aggregation of airflow perturbations from supersonic vehicle 100. Changing the shock structure of the shock waves and moving the shock waves upstream may reduce the undesired effects of these shock waves on supersonic vehicle 100. Plasma may be used to modify the shock structure of and locations of the shock waves. In particular, the plasma may be used to at least one of change the shock structure, reduce the shock waves formed, or change the locations of the formation of the shock waves to thereby reduce drag.

Further, the plasma may also be used to control shock effects near region 134 that includes a turret to control aberrations or potential disturbances related to the components housed within the turret. For example, the plasma may be used to control aberrations in the functioning of sensors used in the turret.

The plasma that is generated around plurality of regions 116 may be cold plasma, which may help reduce and, in some cases prevent, undesired heating of supersonic vehicle 100 when supersonic vehicle 100 travels at supersonic speeds. Further, the plasma generated around plurality of regions 116 may help protect plurality of regions 116 from a directed energy strike.

Figure 2:
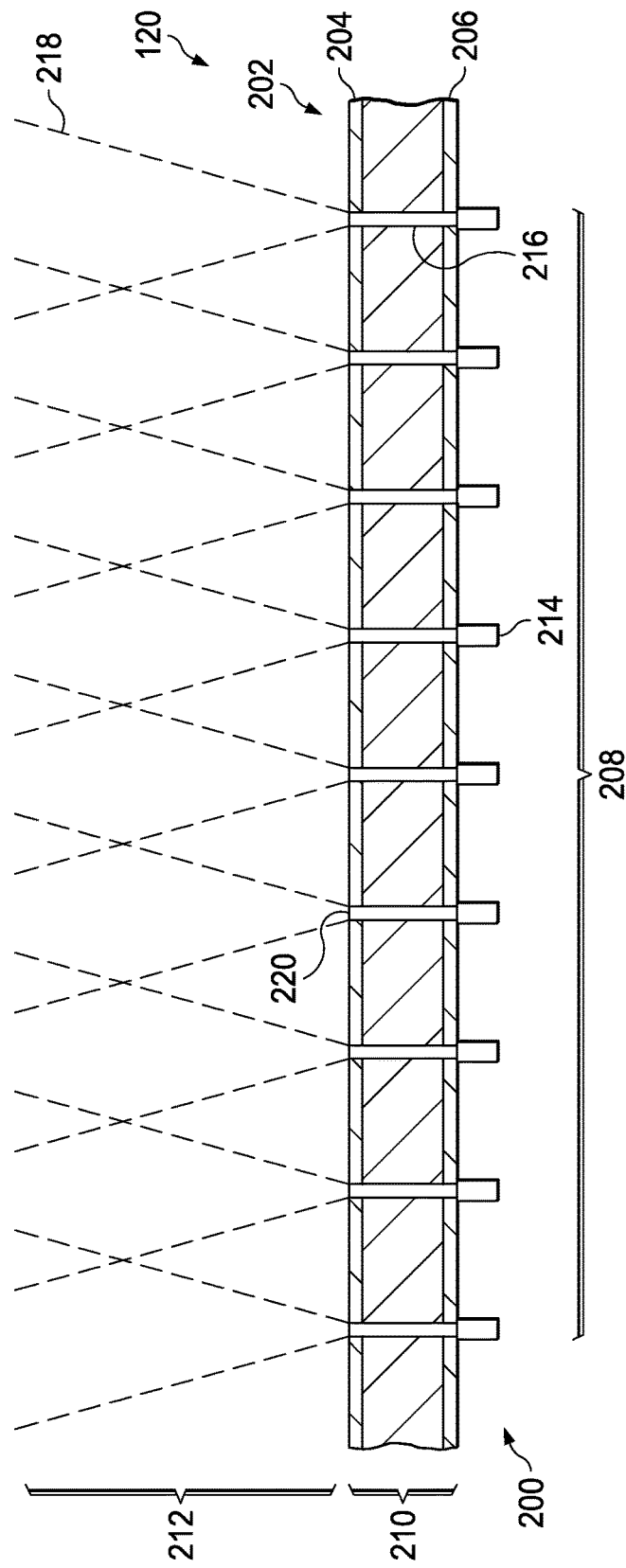
FIG. 2 is an illustration of a plasma generation system in accordance with an illustrative embodiment.

Turning now to FIG. 2, an illustration of a plasma generation system is depicted in accordance with an illustrative embodiment. In this illustrative example, plasma generation system 200 may be an example of one type of plasma generation system that may be used with supersonic vehicle 100 in FIG. 1.

As depicted, plasma generation system 200 is associated with region 120 of supersonic vehicle 100 from FIG. 1. Exterior 202 of supersonic vehicle 100 may comprise exterior surface 204. Exterior surface 204 may be comprised of a continuous surface or a discontinuous surface. Interior structure 206 is present below exterior surface 204. Interior structure 206 may take the form of a panel, a frame structure, or some other type of structure that is located beneath exterior surface 204.

In this illustrative example, plasma generation system 200 includes plurality of ultraviolet energy sources 208 and plurality of light pipes 210. Plurality of ultraviolet energy sources 208 may take the form of, for example, without limitation, a plurality of light emitting diodes or a plurality of laser devices.

Plurality of ultraviolet energy sources 208 are coupled to interior structure 206. Plurality of light pipes 210 are located between interior structure 206 and exterior surface 204 of supersonic vehicle 100. In particular, plurality of light pipes 210 are coupled to plurality of ultraviolet energy sources 208 and exterior 202 formed by exterior surface 204.

Plurality of ultraviolet energy sources 208 generate ultraviolet energy 212. Plurality of light pipes 210 transport ultraviolet energy 212 from plurality of ultraviolet energy sources 208 past exterior 202 of supersonic vehicle 100. In other words, plurality of light pipes transport ultraviolet energy 212 from inside supersonic vehicle 100 to outside supersonic vehicle 100.

Ultraviolet energy source 214 is an example of one of plurality of ultraviolet energy sources 208. Light pipe 216 is an example of one of plurality of light pipes 210. Ultraviolet energy source 214 may generate ultraviolet energy 212 that is transported by light pipe 216 out of supersonic vehicle 100 past exterior 202 of supersonic vehicle 100 to form beam 218 of ultraviolet energy 212.

Beam 218 may be emitted from light pipe 216 at location 220. In one illustrative example, the portion of exterior surface 204 at location 220 of exterior surface 204 may be comprised of a material that is transparent to beam 218 of ultraviolet energy 212 emitted from light pipe 216. In another illustrative example, an opening may be present at location 220.

Ultraviolet energy 212 produced outside of region 120 by plasma generation system 200 may create plasma ions in the air around region 120. In particular, ultraviolet energy 212 creates plasma around region 120 that changes the viscosity of the air to help mitigate the undesired effects of traveling at supersonic speeds.

In one illustrative example, ultraviolet energy source 214 may be configured for a power output of about 1 kilowatt. In some cases, ultraviolet energy source 214 may be configured for a power output of about 1 to about 10,000 Watts. These power outputs may be achieved by the ultraviolet energy source 214 using either pulsed waveforms, continuous waveforms, or a combination thereof. Such pulsed and/or continuous wave forms may be imparted to one, all, or alternating series of plurality of ultraviolet energy sources 208 to achieve the desired beam 218 energy transfer to the adjacent airflow 132 around plurality of regions 116 of interest during operation.

In one illustrative example, ultraviolet energy source 214 may be configured to emit ultraviolet energy 212 continuously over a selected time period or as a selected number of pulses per second or minute. Increasing the power output of ultraviolet energy source 214, increasing the number of pulses of ultraviolet energy per unit time, or both may increase plasma density. Increasing the density of plasma ions in the air may increase the beneficial effects of the plasma in mitigating the undesired effects of supersonic vehicle 100 traveling at a speed greater than the critical Mach number.

The illustrations of supersonic vehicle 100 in FIG. 1 and plasma generation system 200 in FIG. 2 are not meant to imply physical or architectural limitations to the manner in which an illustrative embodiment may be implemented. Other components in addition to or in place of the ones illustrated may be used. Some components may be optional.

Figure 3:
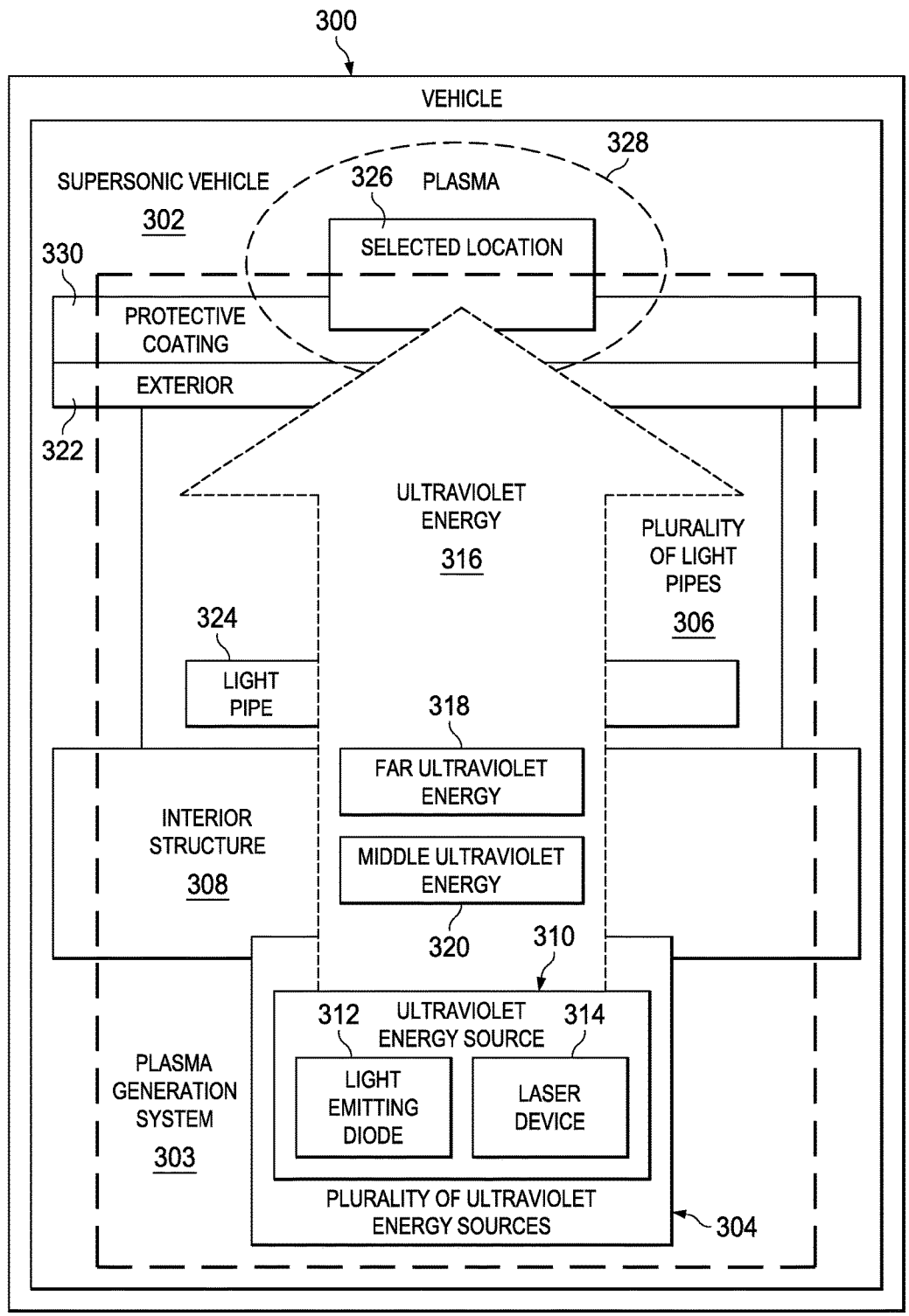
FIG. 3 is an illustration of a vehicle in the form of a block diagram in accordance with an illustrative embodiment.

With reference now to FIG. 3, an illustration of a vehicle is depicted in the form of a block diagram in accordance with an illustrative embodiment. In this illustrative example, vehicle 300 may take the form of an aircraft, an aerospace vehicle, a rocket, a missile, or some other type of vehicle capable of traveling in the air.

In other illustrative examples, vehicle 300 may take the form of a ground vehicle, such as, but not limited to a supersonic car. In some cases, vehicle 300 may take the form of a water vehicle or a vehicle that is capable of traveling both in air and on water.

In this illustrative example, vehicle 300 is capable of traveling at a speed that is at the critical Mach number for vehicle 300. Further vehicle 300 may be capable of traveling at a speed that is greater than the critical Mach number for vehicle 300. The critical Mach number for vehicle 300 is the lowest Mach number at which at which the airflow over some portion of vehicle 300 reaches the speed of sound, but does not exceed the speed of sound.

When vehicle 300 travels at a speed greater than the critical Mach number for vehicle 300, a portion of the airflow around vehicle 300 may be greater than the speed of sound. In other words, when vehicle 300 travels at a speed greater than the critical Mach number for vehicle 300, a portion of the airflow around vehicle 300 is supersonic. Transonic speeds may be speeds between the critical Mach number and a higher speed that is greater than the speed of sound. Within this range of speed, some of the airflow is supersonic but a significant portion of the airflow may not be supersonic. At supersonic speeds, most, if not all, of the airflow is supersonic.

When vehicle 300 is capable of traveling at supersonic speeds, vehicle 300 may be referred to as supersonic vehicle 302. Supersonic vehicle 100 in FIG. 1 is an example of one implementation for supersonic vehicle 302 in FIG. 3. In other illustrative examples, when vehicle 300 is only capable of traveling as fast as transonic speeds, vehicle 300 be referred to as a transonic vehicle. When vehicle 300 is capable of traveling at hypersonic speeds, vehicle 300 may be referred to as a hypersonic vehicle.

When vehicle 300 travels at a speed that is greater than the critical Mach number for vehicle 300, shock waves may be produced. These shock waves may have undesired effects that impact the performance and operation of vehicle 300. Plasma generation system 303 may be associated with vehicle 300 and used to mitigate the undesired effects of vehicle 300 traveling at speeds that are greater than the critical Mach number for vehicle 300. Plasma generation system 200 in FIG. 2 may be an example of one implementation for plasma generation system 303.

In this illustrative example, plasma generation system 303 may include plurality of ultraviolet energy sources 304 and plurality of light pipes 306. Plurality of ultraviolet energy sources 304 may be coupled to interior structure 308 of vehicle 300. Interior structure 308 may take the form of a panel, a frame structure, or some other type of structure inside vehicle 300. Interior structure 308 may function as a support structure for plurality of ultraviolet energy sources 304. Interior structure 308 may be comprised of any number of rods, beams, panels, other types of structural members, or some combination thereof.

Ultraviolet energy source 310 may be an example of one of plurality of ultraviolet energy sources 304. Ultraviolet energy source 310 may take the form of a light emitting diode 312, laser device 314, some other type of semiconductor device, or some other type of device capable of generating ultraviolet energy 316. In some cases, ultraviolet energy source 310 may take the form of a piezoelectric device.

Ultraviolet energy 316 that is generated by plurality of ultraviolet energy sources 304 may take the form of far ultraviolet energy 318, middle ultraviolet energy 320, or some other type of ionizing ultraviolet energy. In these illustrative examples, ultraviolet energy 316 may have a wavelength that is less than about 300 nanometers.

Plurality of light pipes 306 may be coupled to plurality of ultraviolet energy sources 304. Plurality of light pipes 306 may carry or otherwise transport ultraviolet energy 316 from plurality of ultraviolet energy sources 304 outside vehicle 300 past exterior 322 of vehicle 300.

Light pipe 324 is an example of one of plurality of light pipes 306. Light pipe 324 may be comprised of a material that is transparent to ultraviolet energy 316. For example, light pipe 324 may be comprised of at least one of a quartz material, fused silica, sapphire, or some other type of material.

Light pipe 324 may be coupled to ultraviolet energy source 310 in this illustrative example. Light pipe 324 may carry ultraviolet energy 316 generated by ultraviolet energy source 310 such that a beam of ultraviolet energy 316 is emitted outside of vehicle 300 past exterior 322 of vehicle 300 at selected location 326 along exterior 322.

Plasma 328 is created around selected location 326 in response to ultraviolet energy 316 being emitted from light pipe 324. Plasma 328 is created by the creation of plasma ions in the air around selected location 326. In this illustrative example, plasma 328 takes the form of cold plasma, which may help reduce or prevent undesired heating of vehicle 300 around selected location 326.

Ultraviolet energy 316 may be created by the one or more other ultraviolet energy sources in plurality of ultraviolet energy sources 304 in a manner similar to ultraviolet energy source 310. Ultraviolet energy 316 may be transported from the one or more other ultraviolet energy sources in plurality of ultraviolet energy sources 304 out past exterior 322 of vehicle 300 by the one or more other light pipes in plurality of light pipes 306 in a manner similar to light pipe 324.

In this manner, ultraviolet energy 316 may be emitted from plurality of light pipes 306 at selected location 326 such that plasma 328 may be created around selected location 326. Plasma 328 may be used to change the viscosity of the air around selected location 326 to mitigate shock effects produced when vehicle 300 travels at a speed that is greater than the critical Mach number for vehicle 300. Further, plasma 328 may change the viscosity of the air around selected location 326 to reduce drag and undesired heating of vehicle 300 when vehicle 300 travels at speeds greater than the critical Mach number.

In particular, plasma 328 comprises electrically charged ions that may help reduce viscosity by causing the air to be repulsed from the surface of vehicle 300. Thus, the air may flow more smoothly across the surface of vehicle 300 during transonic and supersonic flight.

Further, plasma 328 may add energy to the air inside the boundary layer around selected location 326. Re-energizing the boundary layer may help maintain attachment of the boundary layer to vehicle 300 around selected location 326 and cause separation of the boundary layer to occur further off from selected location 326.

Selected location 326 may be a location that is on a leading edge of a control surface of vehicle 300. The control surface may be, for example, a portion of a wing, a flap, an aileron, a horizontal stabilizer, a vertical stabilizer, or some other type of stabilizer. Depending on the implementation, selected location 326 may be on some other type of structure that is part of or associated with vehicle 300. For example, selected location 326 may be on or near a structure selected from one of a wing, a nose section, a control surface, a stabilizer, a turret, an antenna, a protruding structure associated with vehicle 300, a portion of a body of vehicle 300, or some other structure.

In some cases, plasma 328 may also protect selected location 326 against directed energy strikes. Directed energy strikes may include, for example, without limitation, lightning strikes.

In some illustrative examples, protective coating 330 may be formed over exterior 322 of vehicle 300. Protective coating 330 may protect exterior 322 of vehicle 300 but may also be transparent to ultraviolet energy 316. For example, light pipe 324 may emit ultraviolet energy 316 that passes through protective coating 330 to outside vehicle 300. In some cases, protective coating 330 may take the form of a quartz shell. In some illustrative examples, protective coating 330 may be comprised of a material that comprises at least one of a quartz material, fused silica, sapphire, or some other type of material that is transparent to ultraviolet energy 316.

In other illustrative examples, protective coating 330 may not be transparent to ultraviolet energy 316. For example, without limitation, protective coating 330 may take the form of a layer of thermal protection material. The thermal protection material may comprise at least one of a carbon-carbon material, a silica-based ceramic material, a ceramic material, or some other type of material.

In some illustrative examples, protective coating 330 may be formed by a first plurality of portions of material that are transparent to ultraviolet energy 316 and cover plurality of light pipes 306 and a second plurality of portions of material that are comprised of a thermal protection material. In still other illustrative examples, protective coating 330 may not be used and a thermal protection layer may be used to cover at least a portion of exterior 322 of vehicle 300. Plurality of light pipes 306 may physically pass through this thermal protection layer such that ultraviolet energy 316 may be emitted outside of vehicle 300.

The illustration of vehicle 300 in FIG. 3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although plasma generation system 303 has been described as creating plasma 328 around selected location 326 of vehicle 300, plasma generation system 303 may include other ultraviolet energy sources and light pipes that are positioned within different regions around vehicle 300 to create plasma around other locations. In this manner, plasma generation system 303 may be used to mitigate the undesired effects of traveling at speeds greater than the critical Mach number at various locations around vehicle 300.

Figure 4:
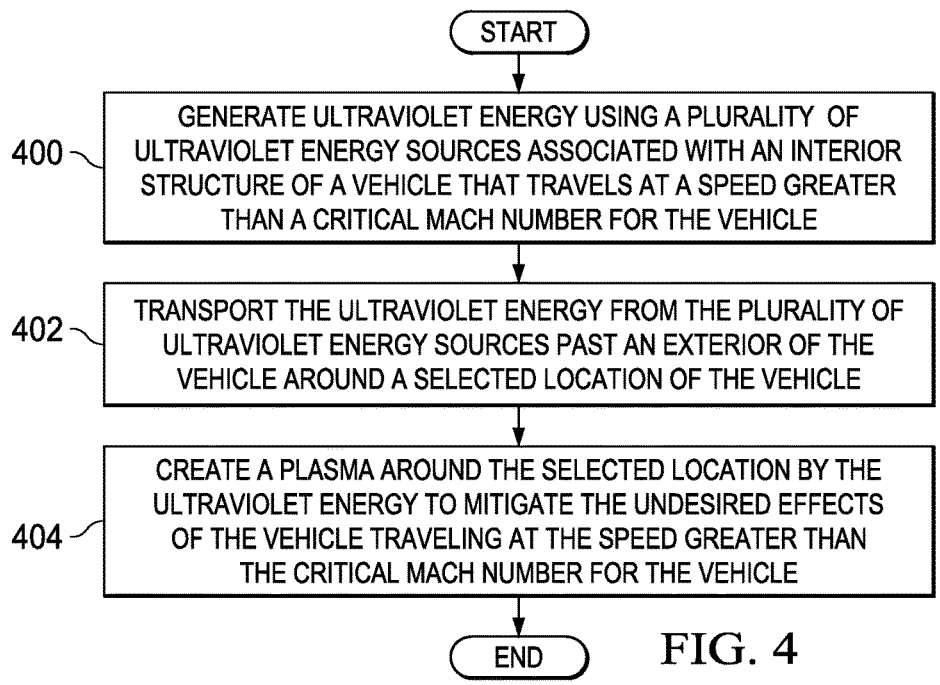
FIG. 4 is an illustration of a process for mitigating undesired effects of a vehicle traveling at a speed greater than a critical Mach number for the vehicle in the form of a flowchart in accordance with an illustrative embodiment.

With reference now to FIG. 4, an illustration of a process for mitigating undesired effects of a vehicle traveling at a speed greater than a critical Mach number for the vehicle is depicted in the form of a flowchart in accordance with an illustrative embodiment. The process illustrated in FIG. 4 may be used with a vehicle, such as, but not limited to, supersonic vehicle 100 in FIG. 1, vehicle 300 in FIG. 3, or some other type of supersonic vehicle or hypersonic vehicle.

The process may begin by generating ultraviolet energy using a plurality of ultraviolet energy sources associated with an interior structure of the vehicle that travels at a speed greater than a critical Mach number for the vehicle (operation 400). Then, the ultraviolet energy is transported from the plurality of ultraviolet energy sources past an exterior of the vehicle around a selected location of the vehicle (operation 402).

A plasma is created around the selected location by the ultraviolet energy to mitigate the undesired effects of the vehicle traveling at the speed greater than the critical Mach number for the vehicle (operation 404), with the process terminating thereafter. In operation 404, the undesired effects may include, but are not limited to, shock effects, drag, and undesired heating of the vehicle.

Figure 5:
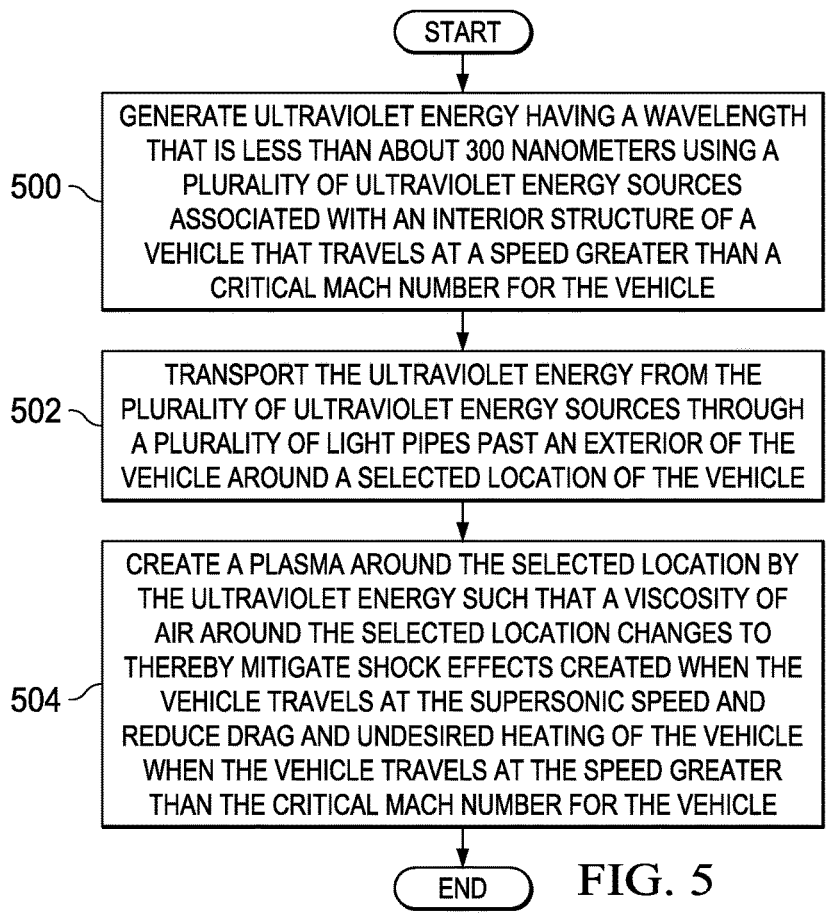
FIG. 5 is an illustration of a process for mitigating undesired effects of a vehicle traveling at a speed greater than a critical Mach number for the vehicle in the form of a flowchart in accordance with an illustrative embodiment.

With reference now to FIG. 5, an illustration of a process for mitigating undesired effects of a vehicle traveling at a speed greater than a critical Mach number for the vehicle is depicted in the form of a flowchart in accordance with an illustrative embodiment. The process illustrated in FIG. 5 may be used with a vehicle, such as, but not limited to, supersonic vehicle 100 in FIG. 1, vehicle 300 in FIG. 3, or some other type of supersonic vehicle or hypersonic vehicle.

The process may begin by generating ultraviolet energy having a wavelength that is less than about 300 nanometers using a plurality of ultraviolet energy sources associated with an interior structure of a vehicle that travels at a speed that is greater than a critical Mach number for the vehicle (operation 500). The ultraviolet energy may be, for example, without limitation, far ultraviolet radiation.

Next, the ultraviolet energy is transported from the plurality of ultraviolet energy sources through a plurality of light pipes past an exterior of the vehicle around a selected location of the vehicle (operation 502). A plasma is created around the selected location by the ultraviolet energy such that a viscosity of air around the selected location changes, to thereby mitigate shock effects, reduce drag, and reduce undesired heating of the vehicle when the vehicle travels at the speed greater than the critical Mach number for the vehicle (operation 504), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
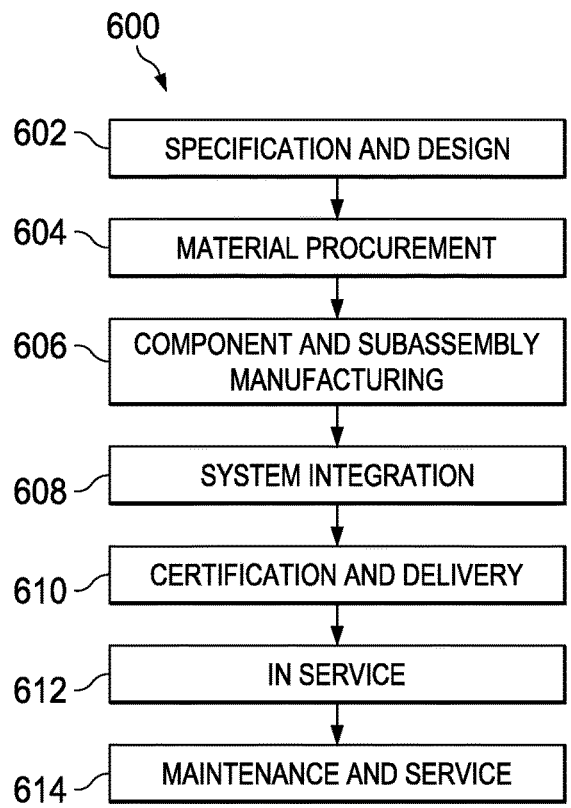
FIG. 6 is an illustration of a vehicle manufacturing and service method in the form of a block diagram in accordance with an illustrative embodiment.
Figure 7:
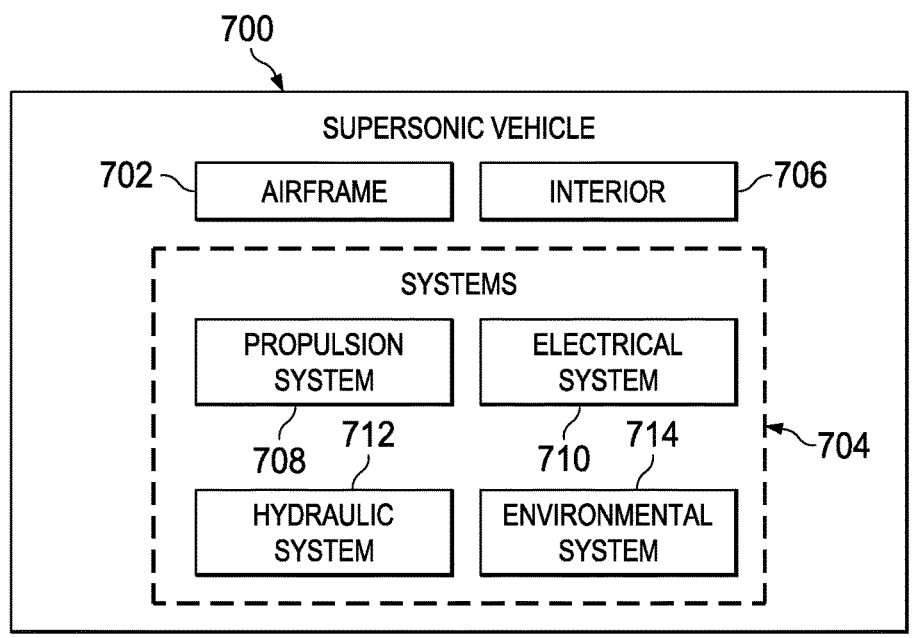
FIG. 7 is an illustration of a supersonic vehicle in the form of a block diagram in accordance with an illustrative embodiment.

Illustrative embodiments of the disclosure may be described in the context of vehicle manufacturing and service method 600 as shown in FIG. 6 and supersonic vehicle 700 as shown in FIG. 7. Turning first to FIG. 6, an illustration of a vehicle manufacturing and service method is depicted in accordance with an illustrative embodiment. During pre-production, vehicle manufacturing and service method 600 may include specification and design 602 of supersonic vehicle 700 in FIG. 7 and material procurement 604.

During production, component and subassembly manufacturing 606 and system integration 608 of supersonic vehicle 700 in FIG. 7 takes place. Thereafter, supersonic vehicle 700 in FIG. 7 may go through certification and delivery 610 in order to be placed in service 612. While in service 612 by a customer, supersonic vehicle 700 in FIG. 7 is scheduled for maintenance and service 614, which may include modification, reconfiguration, refurbishment, and other maintenance or service.

Each of the processes of vehicle manufacturing and service method 600 may be performed or carried out by a system integrator, a third party, and/or an operator. In these examples, the operator may be a customer. For the purposes of this description, a system integrator may include, without limitation, any number of vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of a supersonic vehicle is depicted in which an illustrative embodiment may be implemented. In this example, supersonic vehicle 700 is produced by vehicle manufacturing and service method 600 in FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of vehicle manufacturing and service method 600 in FIG. 6. In particular, plasma generation system 200 from FIG. 2 and plasma generation system 303 from FIG. 3 may be formed and added to supersonic vehicle 700 during any one of the stages of vehicle manufacturing and service method 600. For example, without limitation, plasma generation system 200 from FIG. 2 or plasma generation system 303 from FIG. 3 may be formed as part of supersonic vehicle 700 during at least one of component and subassembly manufacturing 606, system integration 608, maintenance and service 614, or some other stage of vehicle manufacturing and service method 600. Still further, plasma generation system 200 from FIG. 2 or plasma generation system 303 from FIG. 3 may be used while supersonic vehicle 700 is in service 612 to mitigate undesired effects during supersonic flight.

In one illustrative example, components or subassemblies produced in component and subassembly manufacturing 606 in FIG. 6 may be fabricated or manufactured in a manner similar to components or subassemblies produced while supersonic vehicle 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while supersonic vehicle 700 is in service 612 and/or during maintenance and service 614 in FIG. 6. The use of a number of the different illustrative embodiments may substantially expedite the assembly of and/or reduce the cost of supersonic vehicle 700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of ultraviolet energy sources associated with an interior structure of a vehicle that can travel at a speed greater than a critical Mach number for the vehicle; and
a plurality of light pipes that are coupled to the plurality of ultraviolet energy sources and that transport ultraviolet energy from the plurality of ultraviolet energy sources past an exterior of the vehicle around a selected location of the vehicle to create a plasma around the selected location.

2. The apparatus of claim 1, wherein the plasma changes a viscosity of air around the selected location to mitigate shock effects created when the vehicle travels at the speed greater than the critical Mach number for the vehicle.

3. The apparatus of claim 1, wherein the plasma comprises electrically charged ions that reduce a viscosity of air around the selected location, thereby causing the air to be repulsed from a surface of the vehicle.

4. The apparatus of claim 1, wherein the plasma comprises electrically charged ions that add energy to air inside a boundary layer around the selected location, which helps maintain attachment of the boundary layer to the vehicle around the selected location.

5. The apparatus of claim 1, wherein the plasma changes a viscosity of air around the selected location to reduce drag when the vehicle travels at the speed greater than the critical Mach number for the vehicle.

6. The apparatus of claim 1, wherein the plasma changes a viscosity of air around the selected location to reduce undesired heating of the vehicle when the vehicle travels at the speed greater than the critical Mach number for the vehicle.

7. The apparatus of claim 1, wherein the plasma protects the selected location from directed energy strikes.

8. The apparatus of claim 1, wherein an ultraviolet energy source in the plurality of ultraviolet energy sources is selected from one of a light emitting diode or a laser device.

9. The apparatus of claim 1, wherein the ultraviolet energy has a wavelength that is less than about 300 nanometers.

10. The apparatus of claim 1, wherein the ultraviolet energy is selected from one of far ultraviolet energy and middle ultraviolet energy.

11. The apparatus of claim 1 further comprising:
a protective coating on the exterior of the vehicle, wherein the protective coating is transparent to the ultraviolet energy.

12. The apparatus of claim 1, wherein the selected location is on a leading edge of a control surface of the vehicle.

13. The apparatus of claim 1, wherein the selected location is on one of a wing, a nose section, a control surface, a horizontal stabilizer, a vertical stabilizer, a turret, or a body of the vehicle.

14. The apparatus of claim 1, wherein the vehicle is one of a transonic vehicle, a supersonic vehicle, and a hypersonic vehicle.

15. A plasma generation system comprising:
a plurality of ultraviolet energy sources associated with an interior structure of a supersonic vehicle; and
a plurality of light pipes that are coupled to the plurality of ultraviolet energy sources and an exterior of the supersonic vehicle and that transport ultraviolet energy from the plurality of ultraviolet energy sources past the exterior of the supersonic vehicle around a selected location of the supersonic vehicle to create a plasma around the selected location.

16. The plasma generation system of claim 15, wherein the plurality of light pipes comprises:
a light pipe that is coupled to a corresponding ultraviolet energy source in the plurality of ultraviolet energy sources to transport the ultraviolet energy from the corresponding ultraviolet energy source past the exterior of the supersonic vehicle around the selected location.

17. The plasma generation system of claim 15, wherein the plasma reduces a viscosity of air around the selected location to at least one of mitigate shock effects, reduce draft, or reduce undesired heating of the supersonic vehicle when the supersonic vehicle travels at a speed greater than a critical Mach number for the vehicle.

18. A method for mitigating undesired effects of a vehicle traveling at a speed greater than a critical Mach number for the vehicle, wherein the vehicle comprises a plurality of ultraviolet energy sources associated with an interior structure of the vehicle that can travel at a speed greater than a critical Mach number for the vehicle, and wherein the vehicle further comprises a plurality of light pipes that are coupled to the plurality of ultraviolet energy sources and that transport ultraviolet energy from the plurality of ultraviolet energy sources past an exterior of the vehicle around a selected location of the vehicle to create a plasma around the selected location, the method comprising:
generating ultraviolet energy using the plurality of ultraviolet energy sources associated with the interior structure of the vehicle that travels at the speed greater than the critical Mach number for the vehicle;
transporting the ultraviolet energy from the plurality of ultraviolet energy sources through the plurality of light pipes and past the exterior of the vehicle around the selected location of the vehicle; and
creating the plasma around the selected location to mitigate the undesired effects of the vehicle traveling at the speed greater than the critical Mach number for the vehicle.

19. The method of claim 18, wherein creating the plasma comprises:
creating the plasma around the selected location such that a viscosity of air around the selected location changes to thereby mitigate shock effects created when the vehicle travels at the speed greater than the critical Mach number for the vehicle.

20. The method of claim 18, wherein creating the plasma comprises:
creating the plasma around the selected location such that a viscosity of air around the selected location changes to thereby reduce drag and undesired heating of the vehicle when the vehicle travels at the speed greater than the critical Mach number for the vehicle.

21. The method of claim 18, wherein creating the plasma comprises:
creating the plasma to protect the selected location from a directed energy strike.

22. The method of claim 18, wherein generating the ultraviolet energy comprises:
generating the ultraviolet energy having a wavelength that is less than about 300 nanometers.

* * * * *